(12) United States Patent
Kim et al.

(10) Patent No.: US 8,840,388 B2
(45) Date of Patent: Sep. 23, 2014

(54) CONTINUOUS CASTING PROCESS FOR MAKING GOLF BALLS

(75) Inventors: Hyun J. Kim, Carlsbad, CA (US);
Jaerim Kim, San Diego, CA (US);
Kwangjin Choi, Cheongju (KR)

(73) Assignee: Taylor Made Golf Company, Carlsbad, CA (US)

( * ) Notice: Subject to any disclaimer, the term of this patent is extended or adjusted under 35 U.S.C. 154(b) by 323 days.

(21) Appl. No.: 13/329,124

(22) Filed: Dec. 16, 2011

(65) Prior Publication Data

US 2012/0168984 A1 Jul. 5, 2012

Related U.S. Application Data

(60) Provisional application No. 61/428,120, filed on Dec. 29, 2010.

(51) Int. Cl.
| | | |
|---|---|---|
| B29C 31/04 | (2006.01) | |
| B29C 39/10 | (2006.01) | |
| B29C 39/06 | (2006.01) | |
| B29C 39/44 | (2006.01) | |
| A63B 37/00 | (2006.01) | |
| A63B 45/00 | (2006.01) | |
| B29C 39/24 | (2006.01) | |
| B29L 31/54 | (2006.01) | |

(52) U.S. Cl.
CPC .............. B29C 39/10 (2013.01); B29C 39/06 (2013.01); B29C 39/44 (2013.01); A63B 37/0076 (2013.01); B29L 2031/546 (2013.01); A63B 45/00 (2013.01); A63B 37/0003 (2013.01); B29C 39/24 (2013.01)

USPC .......................................... 425/116; 425/259

(58) Field of Classification Search
CPC .. B29C 31/044; B29C 31/045; B29C 31/047; B29C 39/021; B29C 39/06; B29C 39/10; B29C 39/24; B29C 70/70; B29L 2031/546
USPC .......................................... 425/116, 258, 259
See application file for complete search history.

(56) References Cited

U.S. PATENT DOCUMENTS

| | | | |
|---|---|---|---|
| 2,117,400 A * | 5/1938 | Cobb | ............................ 425/116 |
| 3,147,324 A | 9/1964 | Ward | |
| 6,503,073 B2 | 1/2003 | Marshall et al. | |
| 6,719,646 B2 | 4/2004 | Calabria et al. | |
| 6,793,864 B1 | 9/2004 | Dewanjee et al. | |
| 7,041,245 B1 | 5/2006 | Calabria et al. | |
| 8,119,051 B2 * | 2/2012 | Mydlack et al. | ............... 264/275 |
| 2009/0072437 A1 | 3/2009 | Brum | |
| 2009/0166924 A1 | 7/2009 | Kuttappa | |

FOREIGN PATENT DOCUMENTS

DE                3327135 A1 *  2/1985

* cited by examiner

*Primary Examiner* — Robert B Davis
(74) *Attorney, Agent, or Firm* — Klarquist Sparkman, LLP (57) ABSTRACT

A system includes a dispensing station and top and bottom mold portion paths. The dispensing station is configured to dispense materials into one or more hemispherical cavities of a plurality of top mold portions and a plurality of bottom mold portions. The plurality of top mold portions are conveyed at a first speed along the top mold portion path, and the plurality of bottom mold portions are conveyed at a second speed along the bottom mold portion path. The dispensing station can include at least one nozzle coupled to a six-axis robotic member that is configured to move at variable speeds.

15 Claims, 8 Drawing Sheets

FIG. 9B

CONTINUOUS CASTING PROCESS FOR MAKING GOLF BALLS

CROSS-REFERENCE TO RELATED APPLICATION

This application claims the benefit of U.S. Provisional Application No. 61/428,120, which was filed on Dec. 29, 2010, and is incorporated herein by reference in its entirety.

FIELD

This disclosure pertains to casting processes for manufacturing golf balls.

BACKGROUND

Figure 1:
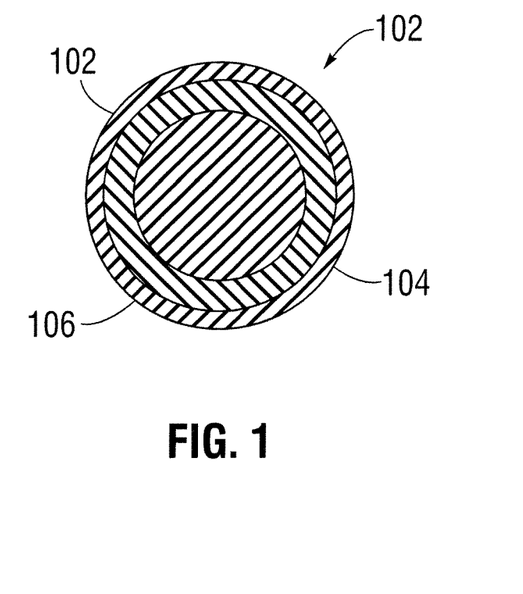
FIG. 1 illustrates a cross-sectional view of an exemplary golf ball.

As shown in FIG. 1, a modern golf ball 100 generally includes multiple layers, including an outer layer 102 called a "cover" and an inner body 104 called a "core." Many modern golf balls also have at least one additional layer, called a "mantle" 106, situated concentrically outside the core 104. The cover 102 is typically formed around the mantle 106 so that the cover is generally concentric with the mantle and the mantle and core are sealed inside the cover. For purposes of description herein, the term "core" is used generally herein to denote the portion of a golf ball located inside the cover and providing the surface on which the cover is formed, regardless of whether the core comprises one or more layers.

Conventional techniques used for forming the cover include casting, compression molding, and injection molding. Casting (also called "cast-molding") is performed in a ball cavity formed by bringing together two mold halves that define respective hemispherical cavities. Casting is especially suitable for forming the cover of a thermoset material. A precise amount of liquid thermoset resin is introduced into the hemispherical cavities and partially cured ("gelled"). The core is placed in the hemispherical cavity of one mold half and supported by the partially cured resin. The second mold half is placed relative to the first mold half to enclose the core and resin in the resulting ball cavity. As the mold halves are brought together, the resin flows around the core and forms the cover. The mold body is heated briefly to cure the resin, and then cooled for removal of the ball from the mold body. Advantages of casting are that it achieves substantial uniformity of cover thickness without having to use centering pins, and it can be performed at a much lower pressure inside the mold than injection molding or compression molding.

Conventional casting techniques require discontinuous "stop-and-go" type actions to dispense material, insert cores/mantles into mold halves, and to assemble the mold and disassembly the molds to manufacture golf balls. It is desirable to provide improved casting methods and systems that provide a more continuous casting process to reduce delays associated with the discontinuous processes of the conventional systems.

SUMMARY

In one embodiment, a method for forming golf balls is provided. The method includes moving a nozzle of a dispensing member into alignment with a moving hemispherical cavity of a top mold portion with the top mold portion moving along a top mold portion path at a first speed along the top mold portion path, and dispensing material through the nozzle and into the hemispherical cavity of the top mold portion while moving the nozzle of the dispensing member at the first speed along the top mold portion path. The speed of the nozzle of the dispensing member relative to the top mold portion path can be changed and the nozzle of the dispensing member can be moved into alignment with a moving hemispherical cavity of a bottom mold portion with the bottom mold portion moving along a bottom mold portion path at a second speed. Material can be dispensed through the nozzle and into the hemispherical cavity of the top mold portion while moving the nozzle of the dispensing member at the second speed along the bottom mold portion path.

In some embodiments, the top and bottom mold portions comprise a plurality of cavities. After dispensing material through the nozzle and into the first hemispherical cavity of the top mold portion, the speed of the nozzle of the dispensing member relative to the top mold portion path can be changed and the nozzle can be moved into alignment with a second moving hemispherical cavity of the top mold portion. Material can then be dispensed through the nozzle and into the second hemispherical cavity of the top mold portion while moving the nozzle of the dispensing member at the first speed along the top mold portion path.

In some embodiments, the top mold portions can be directed along the top mold portion path to a first rotary index table, and the bottom mold portions can be directed along the bottom mold portion path to a second rotary index table. The top mold portions can be rotated on the first rotary index and the bottom mold portions can be rotated on the second rotary index until respective top mold portions are vertically aligned with respective bottom mold portions. One of the respective top or bottom mold portions can be inverted so that the hemispherical cavities of respective top and bottom mold portions are facing one another. Mold assemblies can be formed by coupling respective top and bottom mold portions. In some embodiments, the inversion of the respective top mold portions or bottom mold portions is performed while the first or second rotary index table is rotating.

In other embodiments, a core member is inserted into the hemispherical cavities of the top or bottom mold portions while the top or bottom mold portions are located on the first or second rotary index tables. Also, respective top and bottom mold portions can be aligned using one or more linear motion guides. The linear motion guides can include rails that register the lateral movement of respective top and bottom mold portions.

The mold assemblies can also be directed into a curing station. The mold assemblies can be cured in the curing station by directing infrared radiation at the mold assemblies. The curing station can include a plurality of heating zones having different temperatures, with the temperatures in the plurality of heating zones being regulated by infrared radiation. In some embodiments, the mold assemblies can be moved along a serpentine path in the curing station.

In other embodiments, the mold assemblies can be directed into a cooling station and cold compressed air can be directed at the mold assemblies. The cooling station can include a rotary index table and the cold compressed air can be at a temperature of 0 degrees Celsius or less.

In other embodiments, the mold assemblies can be separated into top and bottom mold portions, and balls can be ejected from the hemispherical cavities of the top and bottom mold portions by a mechanical movement. The method can include detecting whether any balls remain in the hemispherical cavities of the top and bottom mold portions to determine whether or not additional mechanical movements are required to eject balls from the hemispherical cavities of the top and bottom mold portions. In some embodiments, the act of detecting comprises using an infrared sensor to determine the presence of balls in the hemispherical cavities of the top and bottom mold portions.

In another embodiment, a system for forming golf balls is provided. The system can include a dispensing station configured to dispense materials into one or more hemispherical cavities of a plurality of top mold portions and a plurality of bottom mold portions. A top mold portion path is provided along which the plurality of top mold portions are conveyed at a first speed along the top mold portion path, and a bottom mold portion path is provided along which the plurality of bottom mold portions are conveyed at a second speed along the bottom mold portion path. The dispensing station can include at least one nozzle coupled to a six-axis robotic member. The six-axis robotic member can be configured to move along and between the top mold portion path and bottom mold portion path at variable speeds. The six-axis robotic member is configured to move at the first speed when dispensing material into the hemispherical cavities of the top mold portions, at the second speed when dispensing material into the hemispherical cavities of the bottom mold portions, and at a speed different from the first and second speeds when moving between the top mold portion path and bottom mold portion path.

In some embodiments, a first rotary index table is provided for receiving top mold portions and a second rotary index table is provided for receiving bottom mold portions. The first and second rotary index tables are configured to move in opposite directions to assemble respective top and bottom mold portions into mold assemblies.

In some embodiments, a core insert member is configured to insert cores into the top or bottom mold portions as the top and bottom mold portions are received on the first and second rotary index tables. The first rotary index table can also comprise a plurality of core insert members, with each core insert members being associated with one of a plurality of hubs of the first rotary index table. In some embodiments, one of the first or second rotary index tables is configured to invert the top or bottom mold portion as it moves to a position for assembly of the top and bottom mold portions.

In other embodiments, a curing station that includes an infrared heating system can be provided. The infrared heating system can include at least two different temperature zones. The curing station can also include a serpentine path along which the mold assemblies are conveyed.

In other embodiment, a cooling station that utilizes cold compressed air to cool mold assemblies within the cooling station can be provided. The cooling station can include a rotary index table to move the mold assemblies in a generally circular manner.

In some embodiments, at least one physical ejection member is configured to eject balls from the top or bottom mold assemblies, and at least one sensor is configured to determine whether balls have been properly ejected from the top or bottom mold assemblies.

The foregoing and other objects, features, and advantages of the invention will become more apparent from the following detailed description, which proceeds with reference to the accompanying figures.

DETAILED DESCRIPTION

The invention is described in the context of representative embodiments that are not intended to be limiting in any way. As used in this application and in the claims, the singular forms "a," "an," and "the" include the plural forms unless the context clearly dictates otherwise. Additionally, the term "includes" means "comprises." Further, the term "coupled" encompasses any of various ways in which one thing is linked, mounted, or attached to, and does not exclude the presence of intermediate elements between the coupled things.

In the following description, certain terms may be used such as "up," "down,", "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Mold bodies, as disclosed herein, for casting covers on golf balls generally comprise two mold halves (e.g., top and bottom mold portions) each comprising a respective "plate" or analogous support member. Each plate can hold at least one respective mold-cavity insert mounted thereto. Each mold-cavity insert can define a respective substantially hemispherical cavity having surficial features (e.g., dimple convexities) corresponding to desired features to be formed in a ball cover formed in the mold. In preparation for casting a ball cover, opposing mold-cavity inserts are brought together in face-to-face contact so that their respective hemispherical cavities form a spherical ball cavity in which the ball cover can be cast.

To facilitate their being brought together, the two mold halves can be hinged to each other in a book-like or clamshell manner and pivoted to open or close the ball cavities. Alternatively, one or both mold halves can be mounted on linear slides by which the mold halves are brought together face-to-face in a linear manner. Further alternatively, at least one of the mold halves can be mounted on a robotic device that brings the two mold halves together by any of various motions. Further alternatively, the mold halves can simply be configured to be moved and brought together by hand.

Each mold-cavity insert on one mold half corresponds to a respective mold-cavity insert on the other mold half. As a result, the two mold halves of the mold body comprise at least one (desirably multiple, such as four or eight) pair of opposing mold-cavity inserts that, when brought together, cooperate with each other in defining the respective ball cavity. To define the ball cavity fully in a manner suitable for casting a ball cover, the respective "parting surfaces" of the opposing mold-cavity inserts are brought into full contact with each other.

Conventional casting processes often require a series of "stop-and-go" movements at the various processing stations. For example, in some conventional systems, the movement of the mold cavities is halted at one or more processing stations, including at material dispensing stations, core/mantle insert stations, mold assembly stations, and demolding stations. As a result, the overall process cycle time is increased, adversely affecting the productivity of the line. Such stop-and-go movements also can require the line to have a long and/or large footprint to accommodate all of the "stop-and-go" movements at the various stations.

Figure 2:
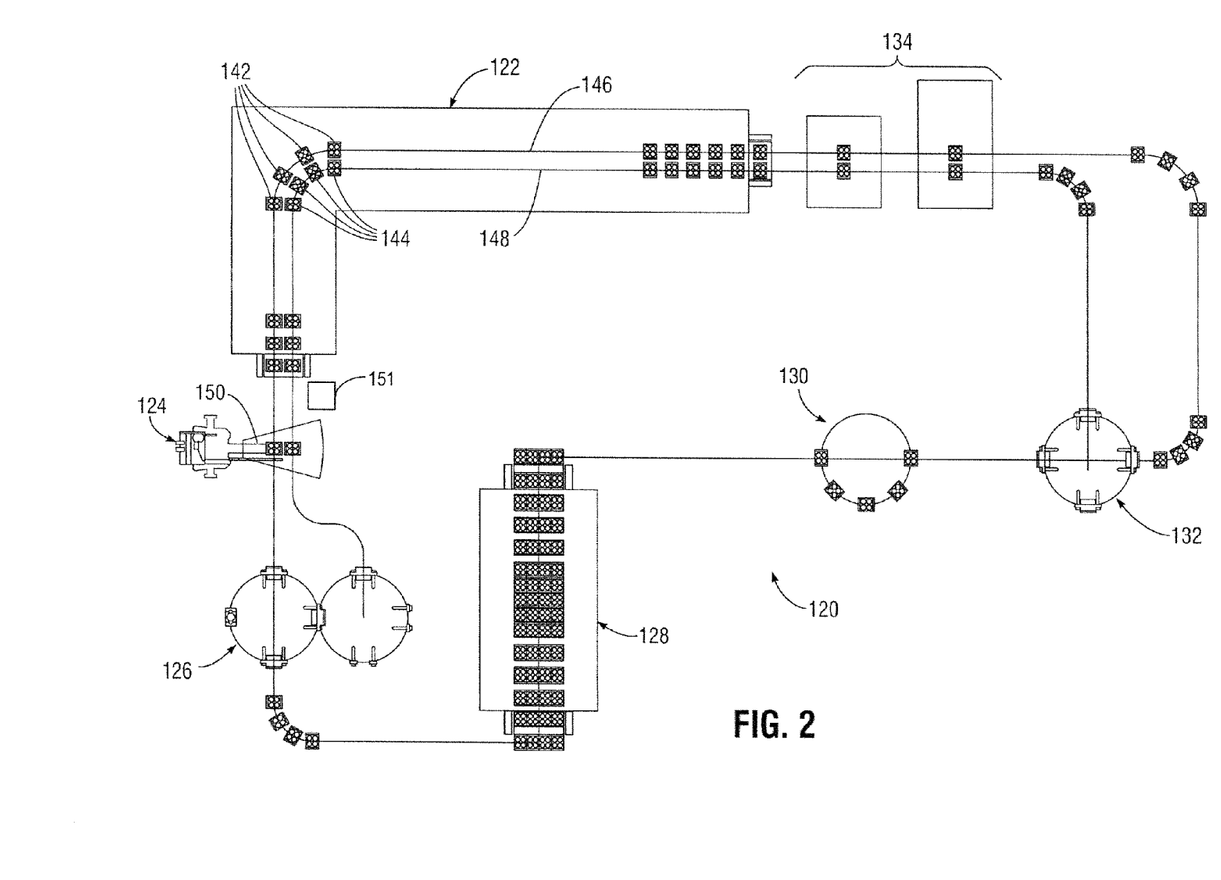
FIG. 2 illustrates an exemplary casting process utilizing dual rotary index tables.
Figure 4:
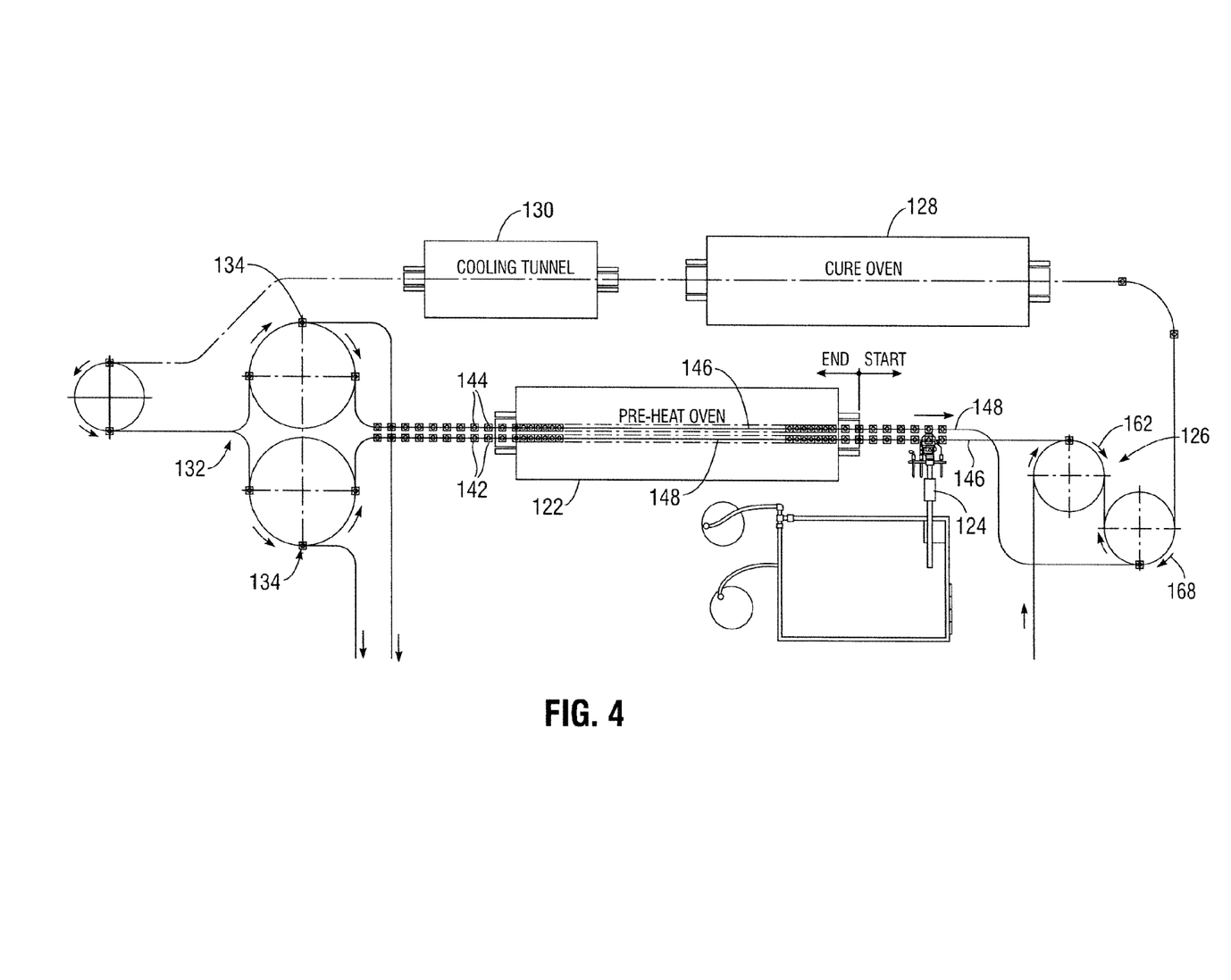
FIG. 4 illustrates another exemplary casting process that utilizes dual rotary index tables.

The following systems and methods can improve the productivity of casting processes for forming golf balls and, at the same time, improve the quality of the golf balls themselves. FIGS. 2 and 4 illustrate two exemplary systems 120 for casting golf balls. As shown in FIGS. 2 and 4, systems 120 can include one or more of the following: a pre-heating station 122, a dispensing station 124, a mold assembly station 126, a curing station 128, a cooling station 130, a demolding station 132, and a ball removal and cleaning station 134.

The systems and methods disclosed herein can be utilized in connection with single cavity molds for molding golf balls; however, they can be particular useful when used with multiple cavity molds. The number of cavities in the molds used in combination with these systems and methods can vary; however, the molds preferably have 1 to 12 cavities, more preferably 2 to 8 cavities, and even more preferably 4 to 6 cavities. The systems and methods disclosed herein can be utilized in combination with any materials conventionally used to cast golf ball covers. Such systems include thermoset polyurethanes and polyureas; and natural or synthetic rubbers such as balata (natural or synthetic), polybutadiene, polyalkenamer; or some combination of the above. Especially preferred are the thermoset polyurea and polyurethane materials formed by combination of polyurea or polyurethane prepolymer (formed by reaction of a polyisoscyanate with a polyamine and polyol respectively) and a curing agent which includes polyamines, polyols or a combination thereof. Examples of such systems include those described in U.S. Pat. No. 3,147,324, which was filed on Oct. 20, 1960, and also those described in U.S. Pat. No. 6,793,864 filed on Feb. 4, 1998 and U.S. Pat. No. 6,719,646 filed on Jan. 25, 2000.

Dispensing Stations

Figure 3:
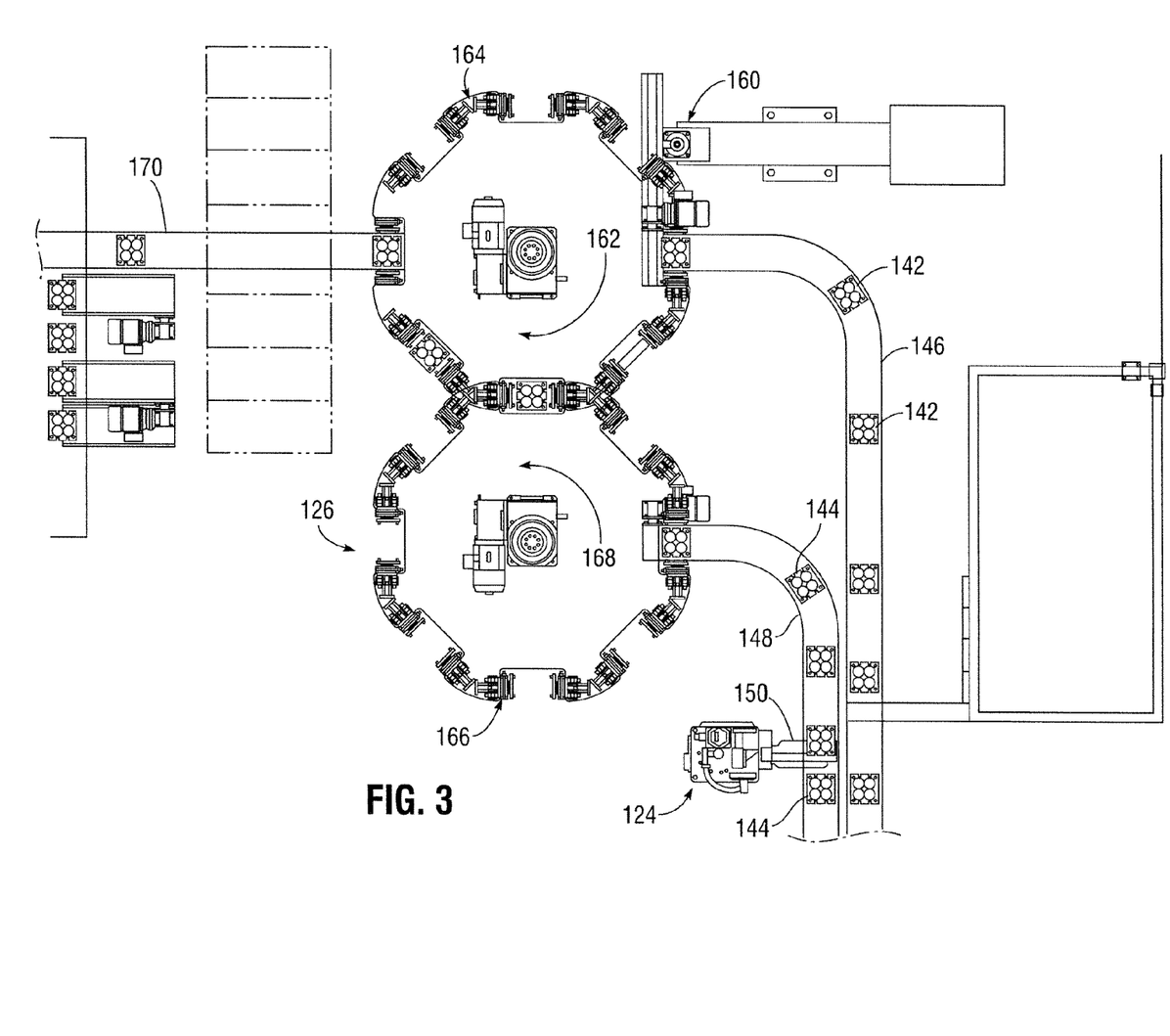
FIG. 3 illustrates a portion of an exemplary casting processing, showing dual rotary index tables and a dispensing member.

Referring to FIG. 3, an embodiment is illustrated where dispensing station 124 comprises a dispensing member 150 that is capable of dispensing a precise amount of material (e.g., a liquid thermoset resin) into the hemispherical cavities of the two mold portions. Each mold assembly 140 can comprise a top mold portion 142 and a bottom mold portion 144. Top and bottom mold portions 142, 144 can travel along different paths (e.g., on separate conveyors) during certain segments of the casting cycle. For example, a top mold portion path 146 is provided for the top mold portions 142 and a bottom mold portion path 148 is provided for the bottom mold portions 142. These separate path segments can be provided for one or more segments of the cycle where the two mold portions are not assembled together, such as during the pre-heating station 122 and/or the dispensing station 124.

The dispensing member 150 can comprise a six-axis robot that can move at various speeds relative to the motion of the top and bottom mold portions 142, 144 in the vicinity of the dispensing station 124. In some embodiments, dispensing member 150 can comprise a single dispensing unit for dispensing material into one or more mold cavities at a time. The dispensing member 150 can be configured to move in the x, y, and z directions while dispensing material (e.g., a mixture of urethane prepolymer and curative) from a single dispensing chamber via a nozzle into one or more mold cavities as they move along the various paths. In other embodiments, multiple dispensing chambers can be provided.

Figure 5:
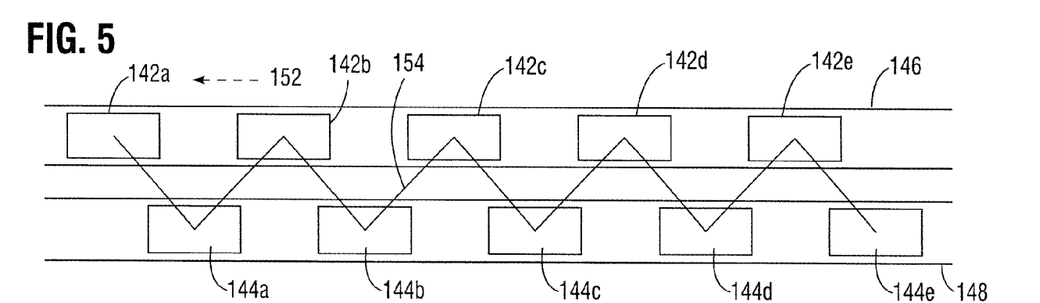
FIG. 5 illustrates an exemplary dispensing pattern for use with the dispensing members disclosed herein.
Figure 6:
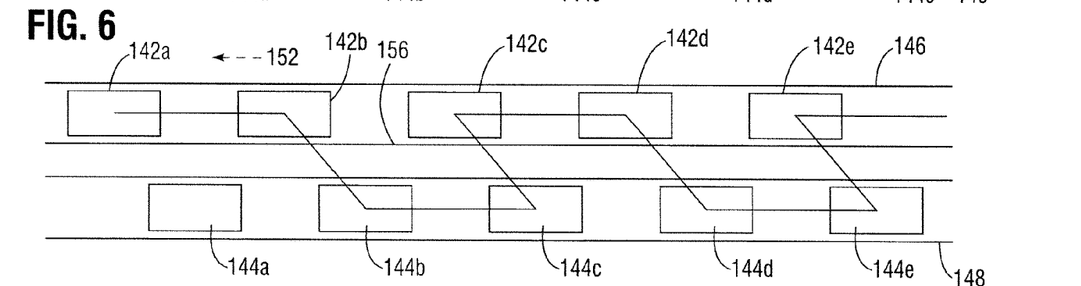
FIG. 6 illustrates another exemplary dispensing pattern for use with the dispensing members disclosed herein.
Figure 7:
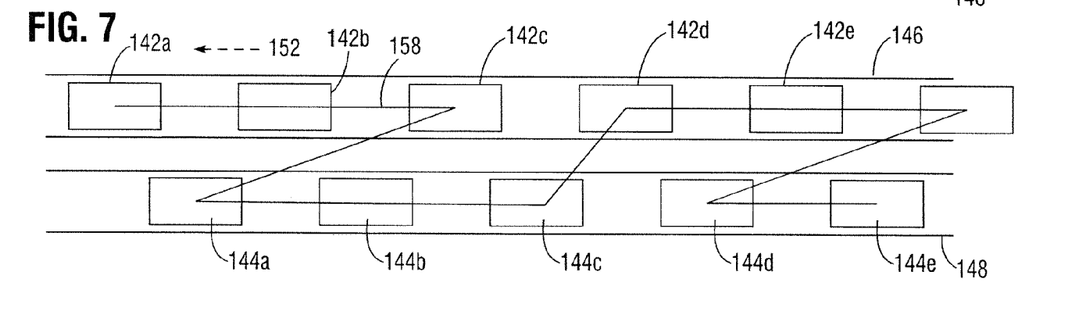
FIG. 7 illustrates another exemplary dispensing pattern for use with the dispensing members disclosed herein.

FIGS. 5-7 illustrate several exemplary dispensing paths for dispensing member 150. Of course, it should be understood that dispensing patterns 154, 156, 158 are illustrative only and other dispensing patterns can be used.

As shown in each of FIGS. 5-7, a plurality of top mold portions 142 can be moved along top mold portion path 146 in the direction shown by arrow 152. At the same time a plurality of bottom mold portions 142 can be moved along bottom mold path 148 in the same direction. While top and bottom mold portions are moved in the same direction, it should be noted that, if desired, they can be moved at different speeds. Thus, top mold portions can move at one speed and bottom mold portions can move at another speed.

Dispensing member 150 is configured to dispense material into one or more cavities of top and bottom mold portions 142, 144. In order to reduce stop-and-go actions at the dispensing station, top and bottom mold portions 142, 144 are preferably allowed to continue moving while dispensing member 150 dispenses material into the mold cavities of the various mold portions. To maintain the movement of the top and bottom mold portions at the dispensing station, dispensing member 150 is configured to move at different speeds so that it can dispense material into a first cavity of a mold portion and then move from that position to another location to dispense material into a cavity of another mold portion. Thus, for example, dispensing member moves at a first speed that matches the speed of a mold portion into which it is dispensing material, then speeds up or slows down to align with another mold portion and, once aligned with that mold portion, changes speed again to match the speed of the new mold portion into which it is dispensing material. By configuring dispensing member to move at various speeds in this manner, unnecessary pauses between dispensing cycles can be reduced and/or eliminated.

FIG. 5 illustrates a first exemplary dispensing pattern 154 in which dispensing member 150 dispenses material into one or more mold cavities of a first top mold portion 142a that is moving along top mold portion path 146. Then, dispensing member 150 moves to a first bottom mold portion 144a that is moving along bottom mold portion path 148 to dispense materials into one or more cavities of the first bottom mold portion 144a. As dispensing member 150 dispenses material into the mold cavities of a particular mold portion, dispensing member 150 can be moved in the direction of arrow 152 at the same speed as the mold portion. In this manner, one or more cavities of mold portions can be filled, without pausing or halting the movement of the mold portions.

FIG. 6 illustrates a second exemplary dispensing pattern 156, where two mold portions moving along a single path (e.g., top mold portion path 146 or bottom mold path 148) receive material from dispensing member 150 before dispensing member 150 moves to the other path to dispense material into the mold portions moving along that path. Thus, for example, one or more cavities in top mold portions 142a and 142b receive material before dispensing member 150 delivers material to bottom mold portions 144b and 144c.

FIG. 7 illustrates a third exemplary dispensing pattern 158, where three mold portions moving along a single path (e.g., top mold portion path 146 or bottom mold path 148) receive material from dispensing member 150 before dispensing member 150 moves to the other path to dispense material into the mold portions moving along that path. Thus, for example, one or more cavities in top mold portions 142a, 142b, and 142c receive material before dispensing member 150 delivers material to bottom mold portions 144a, 144b, and 144c.

In order to move between mold portions without halting the movement of the mold portions along one or both of paths 146, 148, dispensing member 150 is configured to move at different speeds. For example, referring to FIG. 6, while dispensing material into a cavity of top mold portion 142a, dispensing arm 150 moves at the same general speed of top mold portion 142a in the direction of arrow 152. This allows a nozzle of dispensing arm 150 to maintain alignment with the cavity of top mold portion 142a that is receiving the material. However, once dispensing arm 150 completes dispensing material into top mold portion 142a, it then will move to another mold portion, which in FIG. 6 is top mold portion 142b. In order to move into alignment with a cavity of top mold portion 142b, dispensing member 150 must reduce its speed relative to top mold portion 142b. Then, once top mold portion 142b "catches up" to dispensing member 150 and the nozzle of dispensing member 150 is aligned with a cavity of top mold portion 142b, dispensing member 150 begins moving at the same general speed of top mold portion 142b in the direction of arrow 152. Again, by moving at the same general speed of the mold portion, the nozzle of dispensing arm 150 is able to maintain alignment with the cavity of the mold portion that is receiving the material.

As dispensing member 150 moves between top mold portion path 146 and bottom mold portion path 148, it can change speed again relative to the speed of the mold portions on paths 146, 148. Depending on the dispensing pattern being utilized, dispensing member 150 may speed up, slow down, or maintain its speed as it moves between top mold portion path 146 and bottom mold portion path 148. For example, referring to FIG. 5, as dispensing member 150 moves from top mold portion 142a to bottom mold portion 144a, dispensing member 150 can slow down (or even reverse direction) to move into alignment with bottom mold portion 144a. On the other hand, referring to FIG. 7, as dispensing member 150 moves from top mold portion 142c to bottom mold portion 144a, dispensing member 150 can increase its speed in the direction of arrow 152 to catch up to bottom mold portion 144a.

Figure 8:
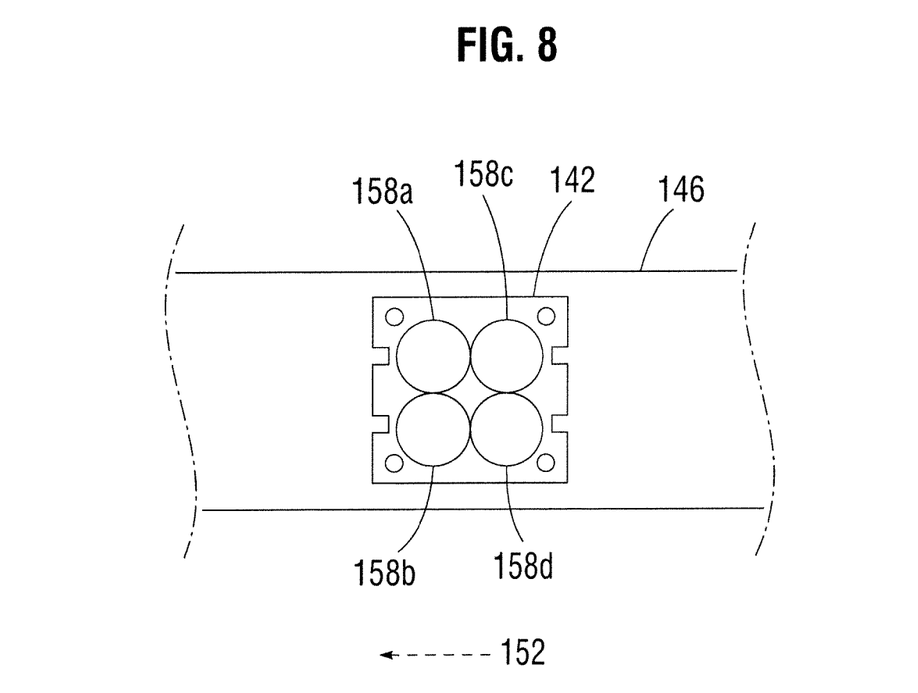
FIG. 8 illustrates an exemplary top mold portion moving along a top mold portion path.

Similarly, the speed of the dispensing member 150 can vary as it moves between cavities of a single moving mold portion. As noted above, each mold portion can comprise one or more cavities. FIG. 8 illustrates a top mold portion 142 that comprises four cavities 158a, 158b, 158c, and 158d. When there are a plurality of cavities in a single mold portion, the movement of dispensing member 150 between cavities can be similar to that described above with respect to the movement of dispensing member 150 between top mold portions and bottom mold portions 142, 144.

For example, as the nozzle of dispensing member 150 moves from alignment with cavity 158a to cavity 158b, its speed in the direction of arrow 152 need not change. That is, dispensing member 150 can continue to move at the same general speed as top mold portion 142. Alignment with cavity 158b can be achieved by changing the location of the nozzle, but not the speed of the dispensing member in the direction of arrow 152. However, as the nozzle of dispensing member 150 moves from alignment with a cavity in a first row (e.g., right cavity 158a, left cavity 158b) to alignment with a cavity in a second row (e.g., right cavity 158c, left cavity 158d), dispensing member 150 must reduce its speed relative to top mold portion 142 to allow a cavity in the second row to "catch up" to the location of the nozzle of dispensing member 150. Although FIG. 8 illustrates four cavities in a mold portion, it should be understood that, as described herein, other numbers of cavities are contemplated.

Thus, as described above, the speed of dispensing arm along the x, y, and z paths to and from each mold portion and to and from each individual cavity of a mold portion (if the mold portion comprises multiple cavities) can be adjusted and varied to adopt various sequences of dispensing. Also, the speed of dispensing arm along the x, y, z paths to and from each mold portion and to and from each individual cavity of a mold portion can be adjusted and varied to conform to various speeds of the mold portions along top mold portion path 146 and bottom mold portion path 148, as well as the various speeds of the index table movements (as described in more detail below). As a result, it is possible to adjust, and preferably reduce, the gel time of the material (e.g., a mixture containing urethane prepolymer). At the same time, such adaptability and adjustability of the movement of dispensing member 150 provides greater flexibility for controlling other portions of the casting process.

Rotary-Type Index Tables

Conventional methods of casting golf balls generally use linear arrangements of stations that require each mold to have a longer waiting period between the various processes in the cycle. As described herein, dual rotary-type index tables can be applied for the processes of core or mantle insert and mold assembly to reduce the occurrence of unnecessary pauses and, in some embodiments, improve the concentricity of the balls.

Referring again to FIG. 3, a core insert station 160 is positioned adjacent a first rotary index table 164 of mold assembly station 126. Once a top mold portion 142 arrives at core insert station 160, cores are loaded immediately into the cavities of the top mold portion 142 and the top mold portion 142 is rotated on the index table in the direction of arrow 162 to a position that is 90 degrees from its original location on first rotary index table 164. As top mold portion (with the inserted core) rotates to that position, top mold portion 142 is inverted so that it is in position for assembly with a respective bottom mold portion 144.

A respective bottom mold portion 144 is received on a second rotary index table 166. Second rotary index table 166 is built lower than the core insert table. Bottom mold portion 144 is rotated in the direction of arrow 168 to a position that is −90 degrees from its original location on second rotary index table 166. As a result, bottom mold portion 144 is in position to be assembled with its respective top mold portion 142. After assembling top and bottom mold portions 142, 144 into an assembled mold assembly 140, the mold assembly is again rotated on first rotary index table 164 to a position that is −180 degree from the original location of top mold portion 142 (e.g., the entry location). At that location, mold assembly 140 can then exit on a conveyor 170 that transfers the assembled mold portions to a curing chamber 128.

The dual rotary index tables 164, 166 disclosed herein can advantageously reduce cycle time by permitting some or all of the processes that involve core insert, mold flipping, and mold assembly to be executed while the table is moving. It should be understood that the entry and exit points of mold portions 142, 144, and the exit point of mold assembly 140 can vary. For example, in some systems it may be preferable to have top mold portions 142 enter first rotary index table at a position that is −90 degrees from the position shown in FIG. 3. Such a position may be desirable, for example, to provide a lengthier period for the core insert to be positioned in the cavities of top mold portion 142 before being inverted for assembly. Other arrangements are contemplated.

In some embodiments, rotary index tables 164, 166 can be driven by an index drive that uses servo motors. However, in a preferred embodiment, rotary index tables 164, 166 are driven using an index drive that uses roller bearings. An index drive that uses roller bearings can provide improved precision and durability over a servo control method. In some embodiments, the roller bearings can comprise a globoidal index drive.

Each rotary index table can have 4 to 16 mold hubs, preferably 6 to 12 hubs, most preferably 8 to 10 hubs. As shown in FIG. 3, rotary index tables 164, 166 can be configured to rotate in opposite directions to execute the sequential processes of core insert and mold assembly without having a waiting time like conventional methods.

To shorten the cycle times even further, each hub can be replaced with stations such as core insert and mold assembly. Thus, for example, top mold portions 142 can enter at various locations along first rotary index table 164 and each entry point can comprise a core insert station configured to insert a core into the mold cavities of the mold portion at that location. In such an embodiment, each of rotary index tables 164, 166 can have 4 to 16 mold stations, preferably 6 to 12 stations, most preferably 8 to 10 stations.

Figure 9A:
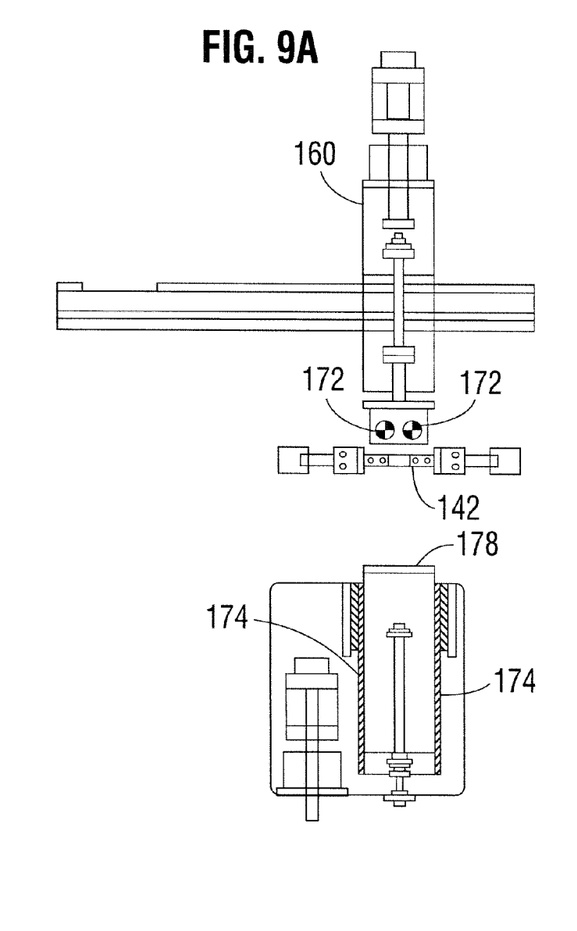
FIGS. 9A and 9B illustrate a core insert station moving between a ready position and an insert position.
Figure 9B:
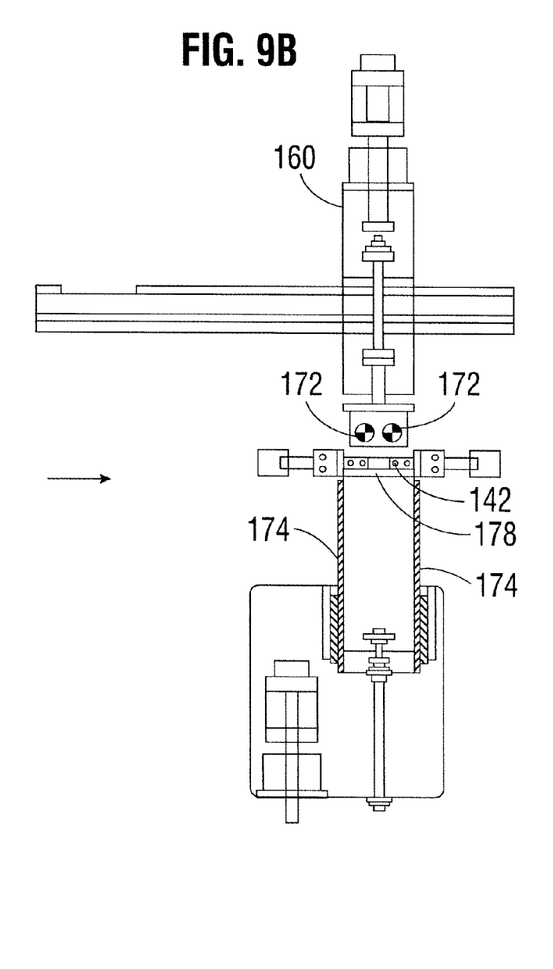

FIGS. 9A and 9B illustrate methods of inserting cores into mold portions. FIG. 9A illustrates a core insert station 160 that comprises a mechanism for moving a plurality of cores 172 downward towards a top mold portion 142. FIG. 9B illustrates cores 172 in an insert position, with the cores 172 and positioned adjacent to cavities of top mold portion 142. As the cores 172 move downward, a lower member lifts up the plate of top mold portion 142 from below.

A gantry 176 can be provided to move top mold portions 142 from the conveyor (e.g., path 146) to core insert station 160 at first rotary index table 164. One or more linear motion guides 174 can be provided to facilitate the lateral alignment of top mold portion 142 with core insert station 160. In some embodiments, linear motion guides 174 can comprise stainless steel rails that register the lateral movement of top mold portion 142 to allow top mold portion 142 to move up and down precisely. Additional lateral alignment can be achieved by providing pins and holes between lifting plate 178 and the mold plate of top mold portion 142. Moreover, in some embodiments, optical sensors and/or proximity sensors can be provided to further improve alignment and productivity.

Linear motion guides 174 can improve the control of the vertical movement of mold plates in a precise manner. The distance of movements of the lifting plate and mold plates can be precisely controlled using one or more servo motors. In some embodiments, the speed of the various elements of core insert station 160 can be further controlled to maximize the speed of a core insert process, while maintain the desired amount of precision. For example, in one embodiment, the initial speed of the core insert moving from a ready position (e.g., FIG. 9A) to an insert position (e.g., FIG. 9B) can be faster than the speed of the core insert moving from the insert position to the point where the cores actually touches the material in the cavity of a particular mold portion. As noted above, by utilizing different speeds for the various movements of the core insert station 160, the system can achieve better quality and improved productivity.

Figure 10A:
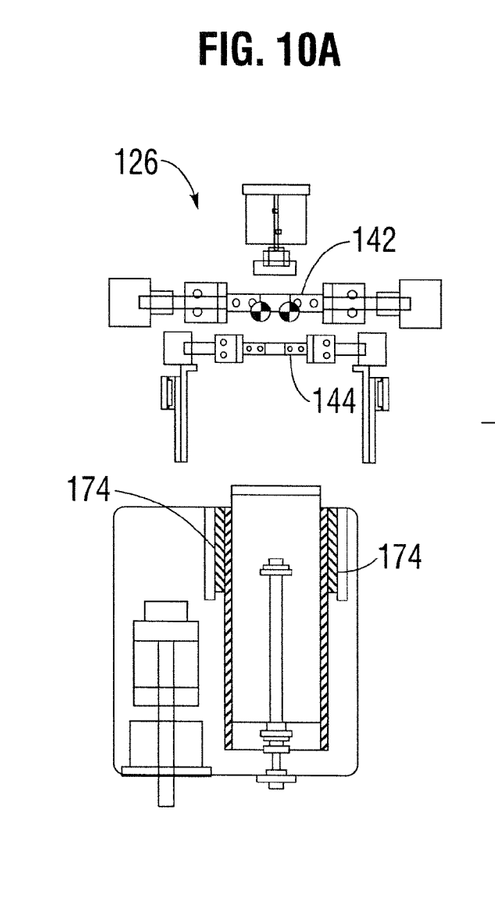
FIGS. 10A, 10B, and 10C illustrate different positions of a mold assembly station.
Figure 10B:
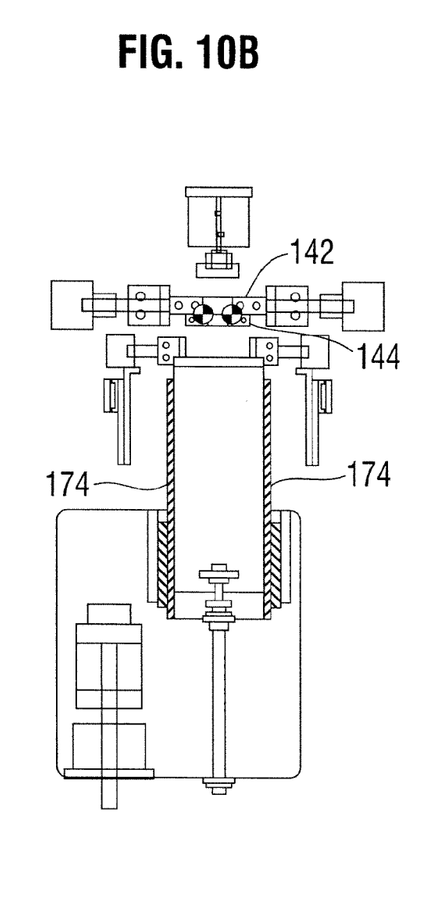
Figure 10C:
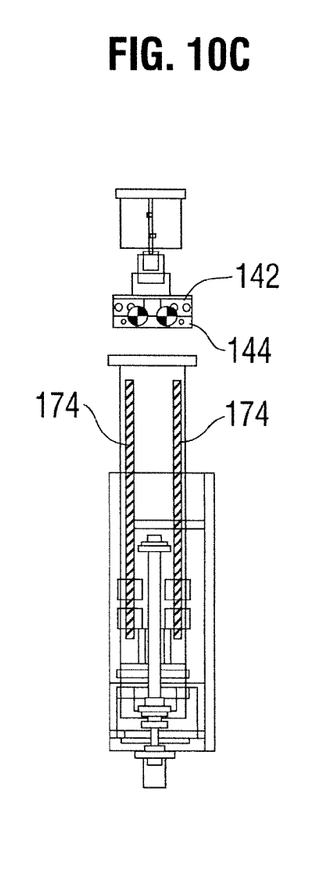

FIGS. 10A-10C illustrate another embodiment of mold assembly station 126. In a manner similar to that shown above with respect to core insert station 160, one or more linear motion guides 174 can be provided to align the top mold portion 142 with the bottom mold portion 144. FIG. 10A illustrates top and bottom mold portions 142, 144 before they are assembled, and FIGS. 10B and 10C illustrate top and bottom mold portions 142, 144 in an assembled state, with FIG. 10B being a view from the front and FIG. 10C being a view from the side.

Curing Stations

Conventional methods of heating the mold assembly generally utilize convection heating system with electric heaters and blowers. However, such systems can be inefficient, because energy is wasted trying to adjust the oven temperature to a desired temperature and maintain homogeneity in the oven.

In some embodiments, infrared (IR) heating can be utilized to cure the mold assembly. When used in this manner, IR can be very heat-efficient, since less energy is required to obtain a homogeneous temperature throughout the oven. Moreover, IR systems can make control of the temperature relatively simple because temperatures can be reached or changed quickly, further improving the cost-effectiveness of IR as an energy source for curing mold assemblies. In some embodiments, to further improve the heat distribution with the curing station, blower can be used together with IR heater.

IR heating also permits the use of different temperature zones throughout the curing station 128. For example, the entrance and exit zones can be set up to have higher or lower temperatures than a middle zone of the curing station. Unlike conventional heaters, which require separate sections (e.g., with physical barriers between sections) to provide different temperature zones, IR heating allows for the creation of different temperature zones without any such separator requirements. Thus, the use of IR heating can improve the processing window for quality and productivity, and can allow for further adaptability within the system by easily and quickly changing the heating parameters of the curing station 128.

The conveying means of mold assemblies 140 within curing stations 128 can also have a non-linear path. Thus, for example, the path can be serpentine (e.g., S-shaped) to shorten the footprint of curing station 128 without requiring a significant decrease in residence times. In other embodiments, paths (e.g., conveyors) of multiple layers can be provided to further increase the available volume of curing station 128 without further increasing the length of the curing station.

Cooling Stations

In some embodiments, cooling station 130 can utilize compressed air to cool mold assemblies 140. Conventional systems generally utilize water to cool mold assemblies a desired amount. Such conventional cooling methods apply cold water directly to the surface of the mold cavity (e.g., by using a water shower). Water cooling, however, has many disadvantages. For example, water cooling introduces waste water treatment issues, since it is necessary to filter large quantities of water to remove residual chemicals and materials generated from the cooling process. Also, water cooling requires additional processes for removing residual moisture from the cavity surfaces before dispensing the golf balls from the mold assembly because water can cause an undesirable reaction with the various materials used to form the golf balls (e.g., urethane prepolymer). Residual water can also cause rust on the mold and cavity surfaces, which can shorten the life time of the tooling.

By using cool compressed air as a cooling media, the deficiencies of water cooling noted above can be reduced or eliminated. Moreover, introducing compressed air into the cooling channel of the mold plate can improve the cooling efficiency of the cooling station 130. In some embodiments, the entire cooling station can comprise an isolated cooling chamber with circulating cold air inside.

Various compressed air systems are contemplated for use with cooling stations 130. For example, a vortex air tube can be used to compress and direct cooled air towards the mold assemblies. In some embodiments, the compressed air preferable has a temperature at or below 0 degrees Celsius. When using vortex air tubes or other similar systems, the air exiting the tubes is at a temperature that is significantly lower than the air entering the tubes, thereby improving the efficiency of the system by reducing the amount the inlet air must be cooled prior to delivery to the tubes. In some embodiments, the tube can be in contact with the cooling chamber of cooling station 130 to utilize the lower temperature of the cooling station itself to further reduce the temperature of the compressed air exiting the tubes.

As shown in FIG. 2, cooling station 130 can utilize a rotary index table to reduce the required size of the cooling chamber. The rotary index table can receive the mold assemblies 140 and move them in a generally circular path within cooling station 130 before they exit cooling station 130.

Ball Removal

In some embodiments, an IR sensor can be provided to aid in the detection of whether balls are left in a mold. Conventional systems generally provide a repeating physical mechanism to eject the balls from the molds. These systems are generally not smart; however, repeating the physical ejection steps whether or not any balls remain captured in the mold. By utilizing IR detection sensors as described herein, such repeating physical mechanisms can be stopped as soon as the IR sensor detects that there are no more balls remaining in a particular mold.

In other embodiments, balls can be removed from the molds and delivered to a receiving tray in the same orientation. By maintaining each of the balls in the same orientation as they are moved from the molds to the receiving tray, further processing of the balls to remove seams (e.g., seam buffing) can be performed without requiring additional alignment efforts.

Detector Systems for Mold Matching

Molding lines, such as the urethane casting lines disclosed herein, can have multiple mold bases running continuously on a conveyor system. For example, in some embodiments, there can be 100 or more mold halves that are repeatedly assembled and disassembled. In embodiments where mold halves are separated and reassembled, it can be desirable to reassemble the same mold halves together during each cycle to help identify and troubleshoot any potential quality issues that may arise. Accordingly, a detector system can be provided to identify instances where the mold pairs that are assembled on the line are not the pair of molds that are expected or otherwise desired to be assembled together.

In one embodiment, the detector system can comprise one or more detectors that are configured to read identification information provided on the mold halves. The identification information can comprise any information that can be observed or otherwise read by the detector(s) to obtain information about the respective mold halves. In one embodiment, for example, each mold half can comprise its own unique identifier, such as a three digit number system. The detector(s) can comprise one or more optical sensors configured to recognize the mold identification information (e.g., the three digit number). Once the mold identification information is recognized, that information can be used by the system to determine if each pair of assembled mold halves includes the expected and/or desired mold halves. Numerical identifiers are provided here as an example; however, it should be understood that other symbols or combinations of symbols can be used to provide information about the mold halves. For example, the system can be programmed to recognize that a mold half with one unique identifier (e.g., alphanumeric identifier 100A) should be matched with another mold half with another unique identifier (e.g., alphanumeric identifier 100B). After the top and bottom mold identification is received by the system, that information can be processed to determine whether the programmed mold matching information matches with the actual matching of mold pairs.

It should be understood that the system can utilize any identifier so long as that identifier can be read by a sensor and conveyed to the system to distinguish one mold halve from another. Similarly, detectors other than optical sensors can be utilized, so long as those detectors are capable of determining whether a particular assembled pair of mold halves includes a predetermined expected and/or desired combination of two mold halves.

As noted above, a detector system can comprise one or more sensors. For example, in one embodiment, a pair of optical sensors can be used to detect identifying information on the top mold and identifying information on bottom mold, respectively. Alternatively, a single detector can be configured to read or otherwise obtain the identifying information from both top and bottom molds.

If an assembled pair of mold halves is found to be mismatched (e.g., the mold halves that were assembled do not correspond to an expected and/or desired pair of mold halves), then the system can be configured to take an appropriate action. In some embodiments, this action can comprise stopping the process to provide an opportunity to correct the improper pairing of mold halves. Alternatively, or in addition to stopping the process, the system can be configured to deliver an alert which identifies the improper pairing of mold halves.

The location of the one or more detectors can vary. In some embodiments, the detectors can be positioned at a location along the line where there is sufficient space to take a desired action when a mismatched pair is identified. For example, if after detecting a mismatched pair of mold halves the system is configured to stop the process, it can be desirable to stop the process with the mismatched pair of mold halves in a position where they can be accessed by' an attendant. Thus, in some embodiments, the detectors can be positioned at a location that is at or adjacent to a location in the line where the mold halves are generally accessible to an attendant. In one example, this location can comprise a generally uninterrupted section of the line that has an accessible area with a length that is at least three times the width of the mismatched pair of mold halves. In this manner, sufficient space can be provided to remove the mismatched pair of mold halves from the line or to otherwise correct that pair of mold halves.

FIG. 2 illustrates a detector system 151 positioned between pre-heating station 122 and dispensing station 124. By positioning detector system 151 before the dispensing station, any mismatching of mold pairs can be resolved prior to dispensing of the material into the cavities of the two mold portions. Although it can be somewhat more efficient to resolve mold mismatching issues prior to dispensing material into the molds, it should be understood that, as discussed above, the detector system 151 can be positioned at other locations along the line.

Thus, by using the detector systems described herein, the system can ensure that matched top and bottom mold halves are assembled together every cycle, thereby' improving investigations into any potential quality issues that may arise in connection with the production of golf balls using the systems and methods described herein.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A system for forming golf balls comprising:
   a dispensing station configured to dispense materials into one or more hemispherical cavities of a plurality of top mold portions and a plurality of bottom mold portions;
   a top mold portion path along which the plurality of top mold portions are conveyed at a first speed along the top mold portion path; and
   a bottom mold portion path along which the plurality of bottom mold portions are conveyed at a second speed along the bottom mold portion path;
   wherein the dispensing station comprises at least one nozzle coupled to a six-axis robotic member, the six-axis robotic member being configured to move along and between the top mold portion path and bottom mold portion path at variable speeds, the six-axis robotic member being configured to move at the first speed when dispensing material into the hemispherical cavities of the top mold portions, at the second speed when dispensing material into the hemispherical cavities of the bottom mold portions, and at a speed different from the first and second speeds when moving between the top mold portion path and bottom mold portion path.

2. The system of claim 1, further comprising:
   a first rotary index table for receiving top mold portions; and
   a second rotary index table for receiving bottom mold portions,
   wherein the first and second rotary index tables are configured to move in opposite directions to assemble respective top and bottom mold portions into mold assemblies.

3. The system of claim 2, further comprising:
   a core insert member configured to insert cores into the top or bottom mold portions as the top and bottom mold portions are received on the first and second rotary index tables.

4. The system of claim 3, wherein the first rotary index table comprises a plurality of core insert members, each core insert members being associated with one of a plurality of hubs of the first rotary index table.

5. The system of claim 2, wherein one of the first or second rotary index tables is configured to invert the top or bottom mold portion as it moves to a position for assembly of the top and bottom mold portions.

6. The system of claim 2 further comprising a curing station comprising an infrared heating system.

7. The system of claim 6, wherein the infrared heating system comprises at least two different temperature zones.

8. The system of claim 6, wherein the curing station comprises a serpentine path along which the mold assemblies are conveyed.

9. The system of claim 2, further comprising a cooling station that utilizes cold compressed air to cool mold assemblies within the cooling station.

10. The system of claim 9, wherein the cooling station comprises a rotary index table to move the mold assemblies in a generally circular manner.

11. The system of claim 2, further comprising:
    at least one physical ejection member configured to eject balls from the top or bottom mold assemblies; and
    at least one sensor configured to determine whether balls have been properly ejected from the top or bottom mold assemblies.

12. The system of claim 2, further comprising:
    a detector system configured to obtain identifying information from the top and bottom mold portions of respective mold assemblies,
    wherein the detector system is configured to compare the identifying information with predetermined mold matching information to determine whether the respective mold assemblies are properly matched.

13. A system for forming golf balls comprising:
    a top mold portion path along which the plurality of top mold portions are conveyed at a first speed along the top mold portion path;
    a bottom mold portion path along which the plurality of bottom mold portions are conveyed at a second speed along the bottom mold portion path;
    a dispensing station configured to dispense materials into one or more hemispherical cavities of a plurality of top mold portions and a plurality of bottom mold portions, the dispensing station comprises at least one nozzle coupled to a six-axis robotic member, the six-axis robotic member being configured to move along and between the top mold portion path and bottom mold portion path at variable speeds, including at least at the first and second speeds;
    a first rotary index table for receiving top mold portions; and
    a second rotary index table for receiving bottom mold portions,
    wherein the first and second rotary index tables are configured to move in opposite directions to assemble respective top and bottom mold portions into mold assemblies.

14. The system of claim 13, wherein the six-axis robotic member is configured to move at the first speed when dispensing material into the hemispherical cavities of the top mold portions, at the second speed when dispensing material into the hemispherical cavities of the bottom mold portions, and at a speed different from the first and second speeds when moving between the top mold portion path and bottom mold portion path.

15. The system of claim 13, further comprising:
    a core insert member configured to insert cores into the top or bottom mold portions as the top and bottom mold portions are received on the first and second rotary index tables,
    wherein one of the first or second rotary index tables is configured to invert the top or bottom mold portion as it moves to a position for assembly of the top and bottom mold portions.

* * * * *